(12) United States Patent
Driskell et al.

(10) Patent No.: US 10,994,985 B2
(45) Date of Patent: May 4, 2021

(54) DISPENSING TAP AND METHODS FOR USING THE SAME

(71) Applicant: Silgan Dispensing Systems Corporation, Grandview, MO (US)

(72) Inventors: William Driskell, Grandview, MO (US); Brandon Ramsuer, Grandview, MO (US); Eelco H. DeMan, Waalwijk (NL); Niels F. G. van Wieringen, Waalwijk (NL); Paulus Zuijderduijn, Waalwijk (NL)

(73) Assignee: Silgan Dispensing Systems Corporation, Grandview, MO (US)

( * ) Notice: Subject to any disclaimer, the term of this patent is extended or adjusted under 35 U.S.C. 154(b) by 0 days.

(21) Appl. No.: 16/685,258

(22) Filed: Nov. 15, 2019

(65) Prior Publication Data

US 2020/0102199 A1   Apr. 2, 2020

Related U.S. Application Data

(63) Continuation of application No. 16/144,210, filed on Sep. 27, 2018, now Pat. No. 10,526,191.

(51) Int. Cl.
*B67D 3/04* (2006.01)
*B65D 77/06* (2006.01)
*F16K 21/04* (2006.01)

(52) U.S. Cl.
CPC ........... *B67D 3/043* (2013.01); *B65D 77/067* (2013.01); *F16K 21/04* (2013.01)

(58) Field of Classification Search
CPC ........ B67D 3/043; B65D 77/067; F16K 21/04
See application file for complete search history.

(56) References Cited

U.S. PATENT DOCUMENTS

| 1,169,863 A | 2/1916 | Peycke |
| 2,216,231 A | 10/1940 | Dentler |

(Continued)

FOREIGN PATENT DOCUMENTS

| DE | 202007002054 U1 | 8/2007 |
| FR | 2608722 A1 | 6/1988 |

(Continued)

OTHER PUBLICATIONS

ISA—Transmittal of International Search Report and the Written Opinion of the International Searching Authority, dated Oct. 15, 2019.

(Continued)

*Primary Examiner* — Donnell A Long
(74) *Attorney, Agent, or Firm* — Barlow, Josephs & Holmes, Ltd.

(57) ABSTRACT

A dispensing tap for liquids includes a body connected to the neck of a container, a dispensing head with an outlet or mouth, and a throat connecting the body to the dispensing head. A shut off valve is configured for sealing engagement with the mouth of the dispensing head, and a piston is axially guided within the dispensing head. The piston includes a peripheral seal slidably engaged with an interior surface of the dispensing head, and a valve stem coupled to the shut off valve. The piston is selectively actuable between a normally closed position an open position. A spring is captured between the piston and the dispensing head normally biasing the piston and shut off valve to the closed position. A vent is in communication with an interior of the body and the vent is opened and closed with movement of the piston and shut off valve.

20 Claims, 12 Drawing Sheets

(56) References Cited

U.S. PATENT DOCUMENTS

| | | |
|---|---|---|
| 2,254,781 A | 9/1941 | Rabbitt |
| 2,289,790 A | 7/1942 | Light |
| 2,570,371 A | 10/1951 | O'Connor |
| 2,591,922 A | 4/1952 | Dath |
| 2,724,588 A | 11/1955 | Sheets |
| 3,285,594 A | 11/1966 | LaBelle |
| 3,452,905 A | 7/1969 | Micallef |
| 3,624,764 A | 11/1971 | Goben |
| 3,866,724 A | 2/1975 | Hollnagel |
| 3,876,549 A | 4/1975 | Touval et al. |
| 4,010,940 A | 3/1977 | Freyler |
| 4,260,143 A | 4/1981 | Kliger |
| 4,640,493 A | 2/1987 | Dudzik |
| 5,011,046 A | 4/1991 | Graf |
| 5,030,490 A | 7/1991 | Bronowicki |
| 5,174,421 A | 12/1992 | Rink |
| 5,419,416 A | 5/1995 | Mayashita |
| 5,447,257 A | 9/1995 | Dark |
| 5,518,377 A | 5/1996 | Bougamont |
| 5,651,536 A | 7/1997 | Daul |
| 5,998,006 A | 12/1999 | Bambara et al. |
| 6,045,119 A | 4/2000 | Erb |
| 6,053,371 A | 4/2000 | Durliat |
| 6,223,954 B1 | 5/2001 | Carow |
| 6,401,752 B1 | 6/2002 | Blackbourn |
| 6,470,910 B2 | 10/2002 | Blackbourn |
| 6,491,189 B2 * | 12/2002 | Friedman ............ B65D 47/248 222/509 |
| 6,520,385 B2 | 2/2003 | Bonningue |
| 6,986,444 B2 | 1/2006 | Fuchs |
| 7,025,233 B2 | 4/2006 | Masuda |
| 7,299,949 B2 | 11/2007 | Greiner-Perth |
| 7,513,395 B2 | 4/2009 | Labinski |
| 8,113,239 B2 | 2/2012 | Richards |
| 8,402,999 B2 | 3/2013 | Nini |
| 8,464,917 B2 | 6/2013 | Nini |
| 8,474,664 B2 | 7/2013 | Ophardt |
| 9,539,597 B2 | 1/2017 | Ding |
| 9,580,292 B2 | 2/2017 | Smith et al. |
| 10,138,971 B1 | 11/2018 | Deman |
| 10,526,191 B1 | 1/2020 | Driskell et al. |
| 2002/0146551 A1 | 10/2002 | Freedman et al. |
| 2006/0208008 A1 | 9/2006 | Sweeton |
| 2007/0045349 A1 | 3/2007 | Foster |
| 2007/0075101 A1 * | 4/2007 | Von Essen ............ B67D 3/043 222/505 |
| 2007/0119864 A1 | 5/2007 | Tsai |
| 2007/0131725 A1 * | 6/2007 | Friedman ............ F16K 15/185 222/518 |
| 2009/0301572 A1 | 12/2009 | Nini |
| 2013/0341366 A1 | 12/2013 | Campbell et al. |
| 2015/0069094 A1 | 3/2015 | Maher et al. |
| 2016/0201755 A1 | 7/2016 | Hufenbach |
| 2016/0332181 A1 | 11/2016 | DeMan |
| 2017/0128966 A1 | 5/2017 | Law et al. |
| 2017/0190562 A1 | 7/2017 | Trettin |
| 2017/0247239 A1 | 8/2017 | Nini |
| 2018/0056259 A1 * | 3/2018 | Roberts ............ B01F 15/0429 |
| 2018/0186522 A1 | 7/2018 | Kieras et al. |
| 2018/0188092 A1 | 7/2018 | Kieras et al. |
| 2019/0031401 A1 * | 1/2019 | Ramsuer ............ B65D 25/42 |
| 2019/0031490 A1 | 1/2019 | Trettin et al. |
| 2019/0054486 A1 | 2/2019 | DeMan et al. |
| 2019/0277194 A1 * | 9/2019 | DeFelice ............ F02K 3/075 |

FOREIGN PATENT DOCUMENTS

| | | |
|---|---|---|
| GB | 720804 A | 12/1954 |
| JP | 2011240992 A | 12/2011 |
| WO | WO2017050394 A1 | 9/2015 |

OTHER PUBLICATIONS

International Search Report, PCT/US20/63501, dated Mar. 3, 2021.

* cited by examiner

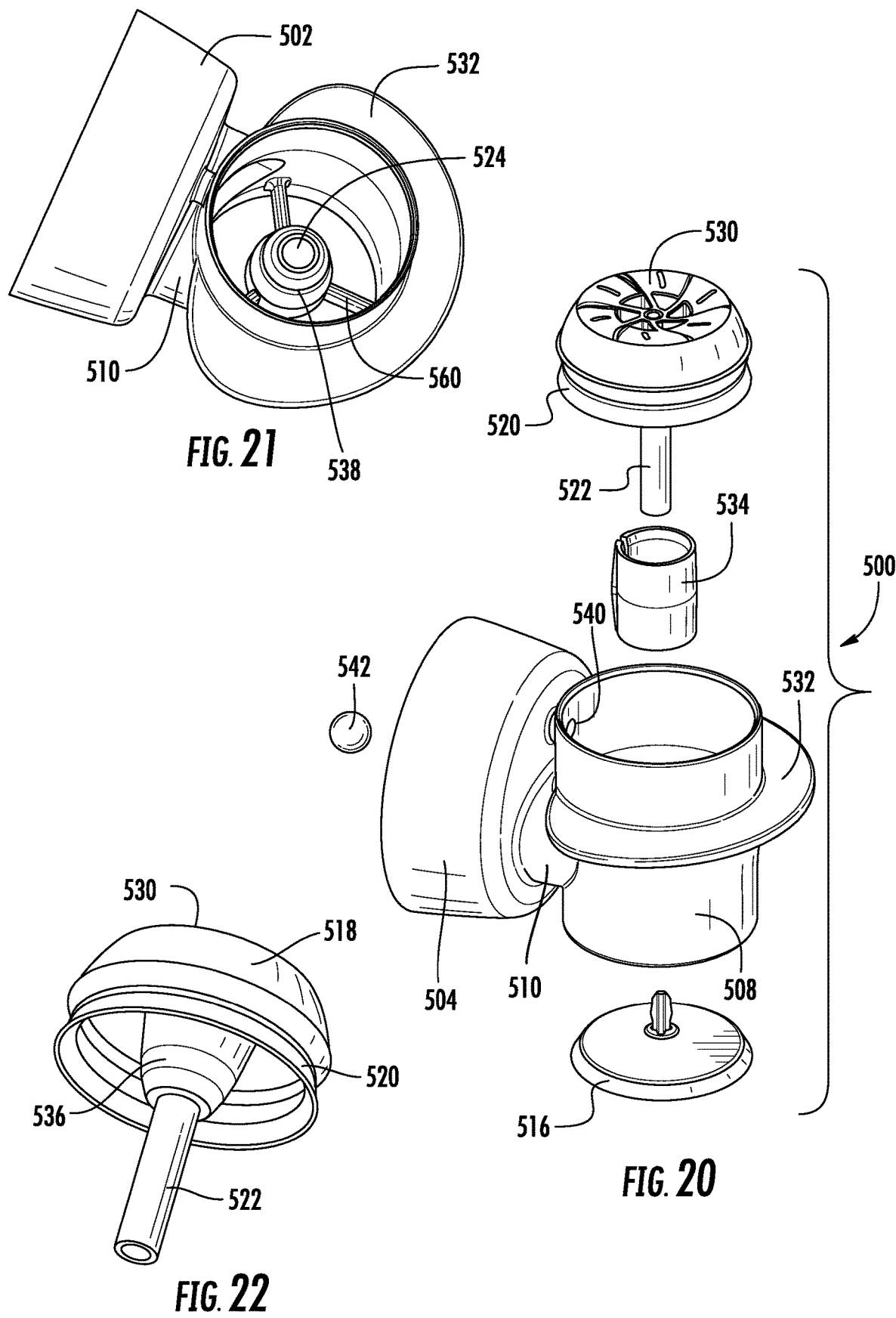

DISPENSING TAP AND METHODS FOR USING THE SAME

CROSS-REFERENCE TO RELATED APPLICATIONS

This application is a continuation of U.S. application Ser. No. 16/144,210 filed Sep. 27, 2018.

BACKGROUND OF THE DISCLOSURE

Embodiments of the invention relate to dispensing devices for flowable products such as liquid laundry detergent, and more particularly to a novel high flow rate dispensing tap.

Dispensing taps are known for fluid materials. They generally comprise a dispensing head and an actuator for opening a valve. While these taps have found widespread use, they suffer from numerous ergonomic and functional issues which make them difficult to use. The actuators are often difficult to manipulate, and the flow rate is much too slow for consumer satisfaction, resulting in the consumer having to hold the tap open for longer than desired.

Consumers continually drive the need for novel dispensing devices which provide easier use, more functionality, better ergonomics and better dispensing options for a variety of liquid or fluid products for various uses. Accordingly, there is always a need for improved dispensing options.

SUMMARY OF THE INVENTION

According to certain exemplary embodiments of the invention, the present disclosure provides an ergonomic, high flow rate, self-venting dispensing tap for a high-viscosity, flowable fluid or liquid formulation, such as a laundry detergent.

According to some embodiments, a dispensing tap may include a body having a peripheral skirt for connection to the neck of a container, a dispensing head, and a throat connecting the body to the dispensing head which provides a flow path from the body to the dispensing head. The dispensing head may further include a dispensing outlet or mouth. A shut off valve may be configured for sealing engagement with the mouth of the dispensing head, and a piston may be axially guided within the dispensing head. The piston may include a peripheral seal slidably engaged with an interior surface of the dispensing head. A valve stem extends from the piston and a terminal end thereof may be coupled to the shut off valve. In use, the piston may be selectively actuable by either a button integrated with the piston or a separate lever between a normally closed position wherein the shut off valve is seated within the mouth, and an open position wherein the shut off valve is disengaged from the mouth. A spring may be captured between the piston and the dispensing head normally biasing the piston and shut off valve to the closed position. In some embodiments, an atmospheric or airless vent may be provided in communication with an interior of the body and in some embodiments, the vent may be opened and closed with movement of the piston and shut off valve.

In some embodiments, the spring may comprise a slotted tubular spring element formed from a tensile polymer. The slotted tubular spring element may be captured between opposing loading cones formed on the piston and the dispensing head.

According to other embodiments, the spring may comprise a conventional coil spring captured between the piston and dispensing head.

In order to provide a high flow rate from the dispensing head, the cross-sectional flow area of the outlet or mouth may be greater than the cross-sectional flow area of the throat.

In some embodiments, the vent may include a ball valve disposed within an interior of the body, or the ball valve may be located at the terminal end of an extension tube which would extend into the interior of the container when mounted.

Certain embodiments of the invention may include a peripheral piston seal which is configured for engagement with a vent opening formed on the interior surface of the dispensing head. The peripheral seal may be engaged with the vent opening when the piston is in the closed position and may be disengaged from the vent opening when the piston is in the open position. This arrangement creates a self-venting system wherein the vent and the shut off valve are opened simultaneously.

In some embodiments, the diameter of the peripheral seal on the piston is larger than the diameter of the shut off valve. In this manner, when pressure is exerted on the container, the pressure is greater on the piston seal than the shut off valve, and naturally exerts a higher force in the closed direction to keep the shut off valve closed.

According to some embodiments of the invention, the dispensing head includes external finger holds to facilitate depression of the actuator button or lever connected to the piston.

BRIEF DESCRIPTION OF THE DRAWINGS

While the specification concludes with claims particularly pointing out and distinctly claiming particular embodiments of the present invention, various embodiments of the invention can be more readily understood and appreciated by one of ordinary skill in the art from the following descriptions of various embodiments of the invention when read in conjunction with the accompanying drawings in which:

FIG. 20 illustrates an exploded perspective view thereof;

FIG. 21 illustrates a perspective view of the dispensing head thereof;

FIG. 22 illustrates a perspective view of the actuator piston thereof;

DETAILED DESCRIPTION OF THE INVENTION

Figure 1:
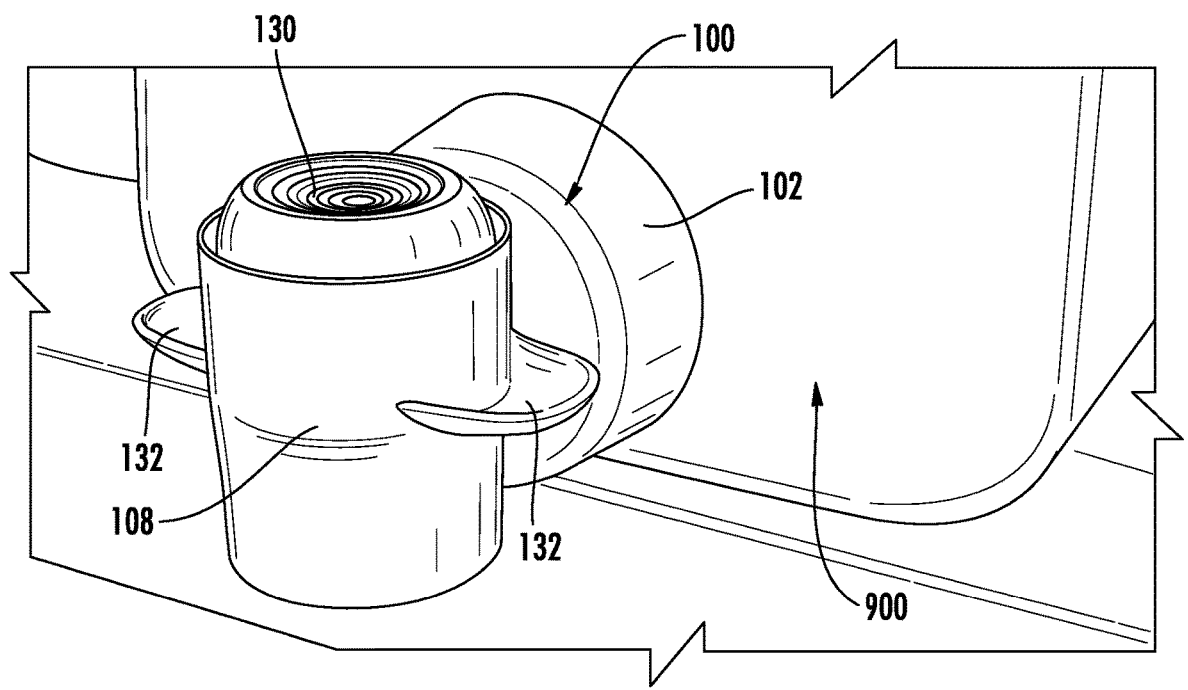
FIG. 1 illustrates a liquid container and a dispensing tap in accordance with an exemplary embodiment of the invention.
Figure 2:
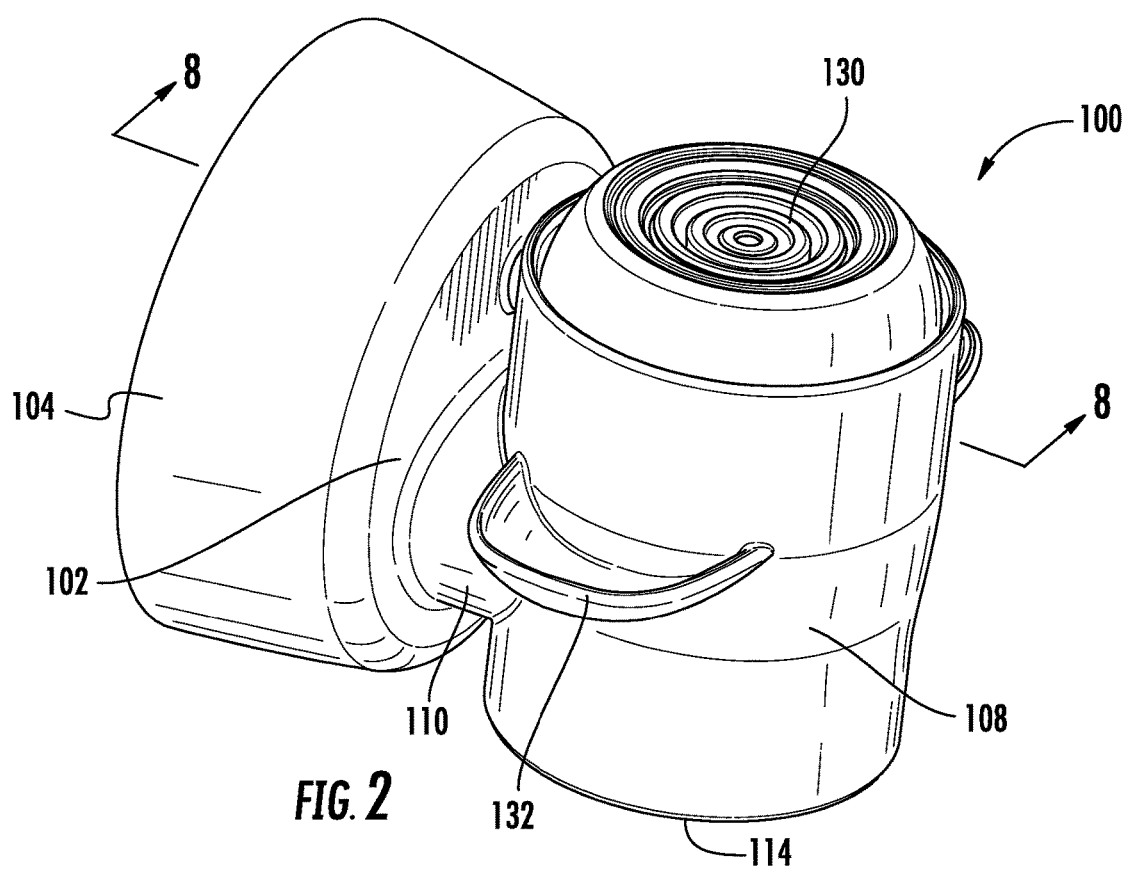
FIG. 2 illustrates a perspective view of the exemplary dispensing tap in FIG. 1.
Figure 3:
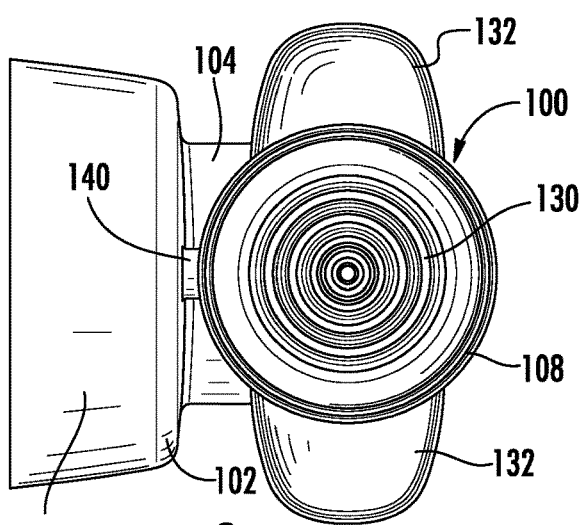
FIGS. 3-7 illustrate various views thereof.

Certain exemplary embodiments will now be described to provide an overall understanding of the principles of the structure, function, manufacture, and use of the device and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like top, bottom, up, or down are used, they are not intended to limit the systems, devices, and methods disclosed herein. A person skilled in the art will recognize that these terms are merely relative to the system and device being discussed and are not universal.

According to certain exemplary embodiments of the invention as described herein, the present disclosure provides an ergonomic, high flow rate, self-venting dispensing tap for a high-viscosity, flowable fluid or liquid formulation, such as a laundry detergent.

Referring generally to FIGS. 1-10, and according to some embodiments of the invention, a dispensing tap 100 may generally include a body 102 having a peripheral skirt 104 for connection to the neck 902 (See FIG. 11) of a container 900.

Figure 11:
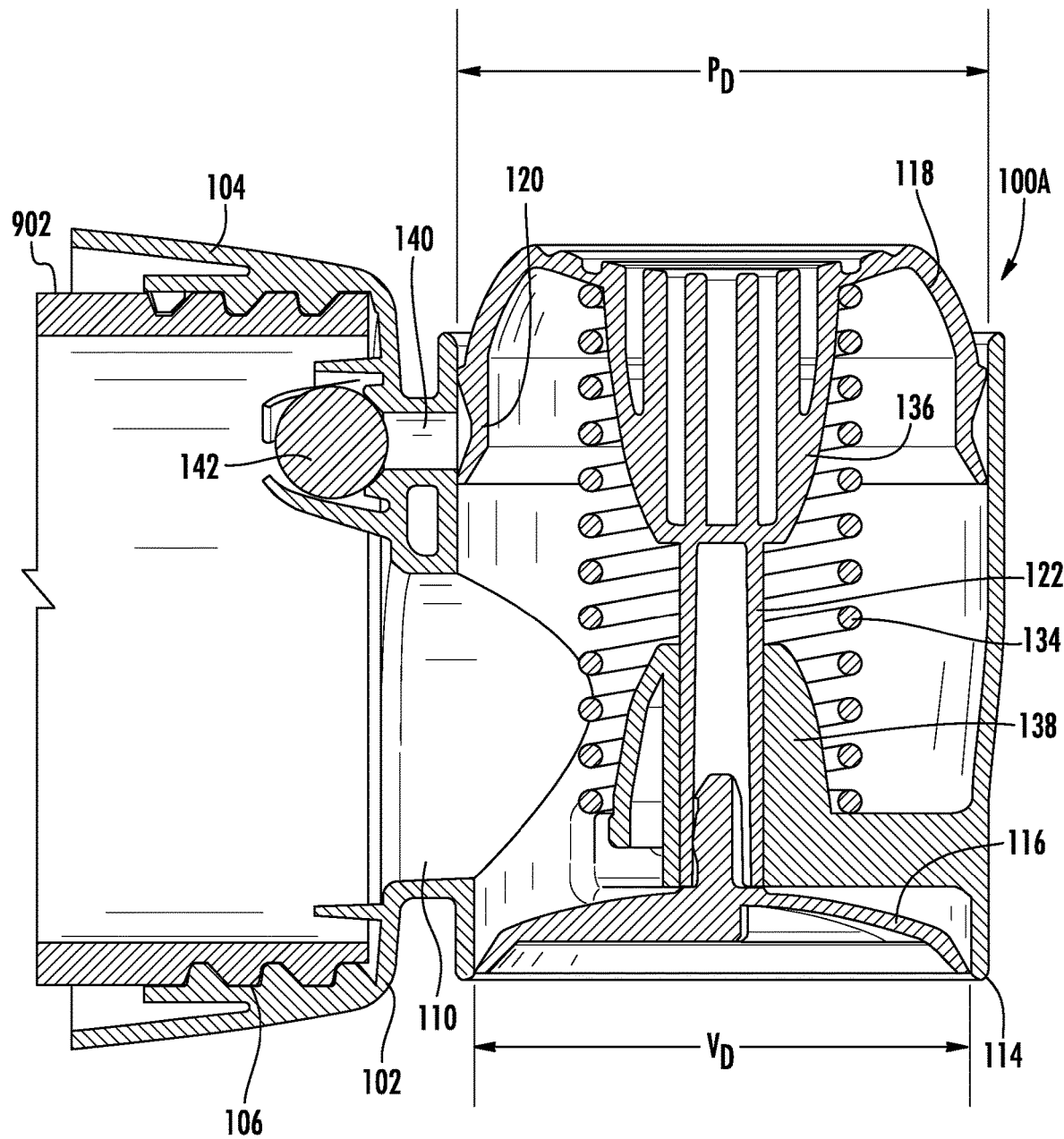
FIG. 11 illustrates a cross-sectional view of another exemplary embodiment of the dispensing tap including a coil spring.

Referring to FIGS. 1 and 11, an exemplary embodiment of the container 900 includes a neck 902 or opening for connection of the dispending tap 100. In some embodiments, the container neck 902 and skirt 104 may include complementary threads 106 where the tap structure 100 may be threaded or rotated into place on the container 900, or the neck 902 and skirt 102 may be provided with a bayonet or other connection.

The dispensing tap 100 may further include a dispensing head 108, and a throat 110 connecting the body 102 to the dispensing head 108 where the throat 110 provides a fluid flow path 112 from an interior of the body 102 to an interior of the dispensing head 108.

Figure 8:
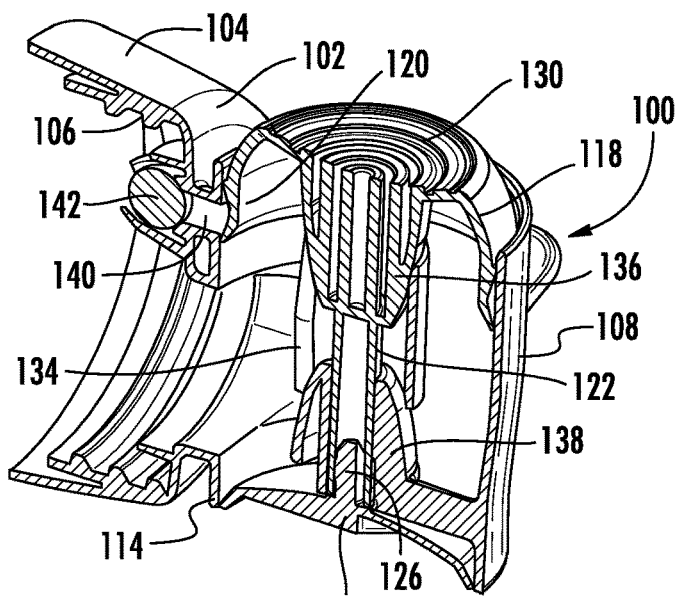
FIG. 8 illustrates a cross-sectional view thereof taken along line 8-8 of FIG. 2.
Figure 9:
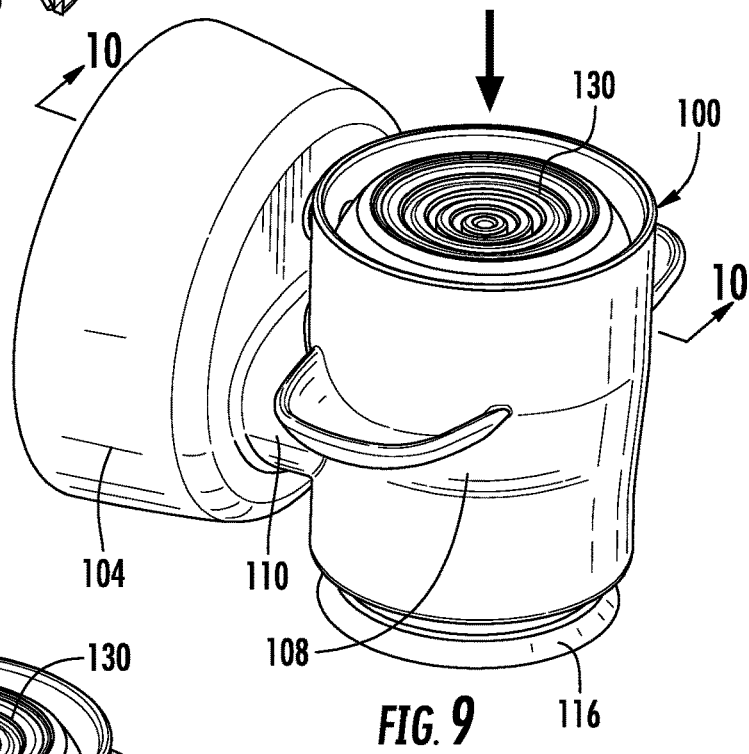
FIG. 9 illustrates a perspective view thereof with the actuator piston depressed for dispensing.
Figure 10:
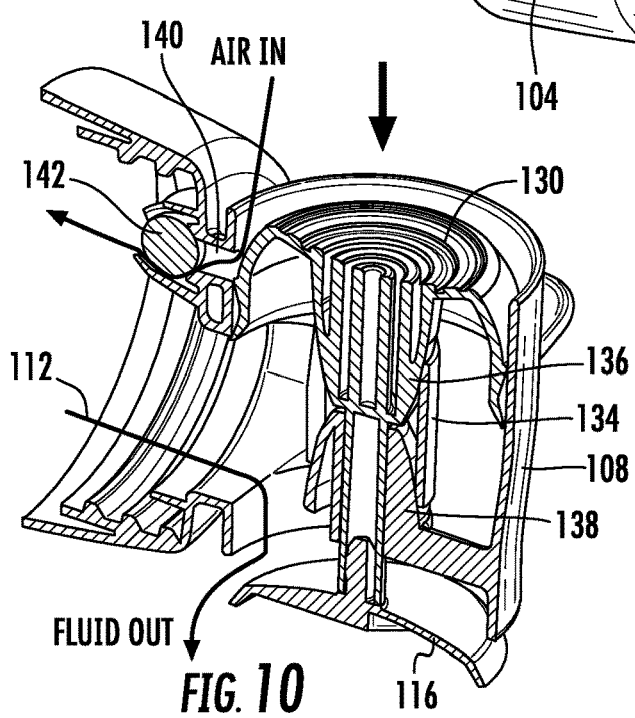
FIG. 10 illustrates a cross-sectional view thereof taken along line 10-10 of FIG. 9.

The exemplary dispensing head 108 is oriented vertically and may include a dispensing outlet or mouth 114 at a lower end thereof. Referring to FIGS. 8-10, a shut off valve 116 may be configured for sealing engagement with the mouth 114 of the dispensing head 108. The shut off valve 116 may be elastomeric or other material suitable for forming a fluid seal with the mouth 114.

Still referring to FIGS. 8-10, a piston 118 may be axially guided within the dispensing head 108. The piston 118 may include a peripheral seal 120 which is slidably engaged with an interior surface of the dispensing head 108 at the upper end thereof. A valve stem 122 extends downwardly from the piston 118 and is further guided by a guide cylinder 124 formed within the lower end of the dispensing head 108. A terminal end of the valve stem 122 extends below the guide cylinder 124 and may be coupled to the shut off valve 116. In the exemplary embodiments, a nipple 126 on the upper surface of the shut off valve 116 is press fit into a bore 128 in the terminal end of the valve stem 122.

In use, the piston 118 may be selectively actuable or depressible (see arrows in FIGS. 9-10) by a button structure 130 which is integrated with the upper surface of the piston 118. The piston 118 may be actuated between a normally closed position (See FIGS. 2-8) wherein the shut off valve 116 is seated within the mouth 114, and an open position (See FIGS. 9 and 10) wherein the shut off valve 116 is disengaged from the mouth 114. The button structure 130 may be integrally formed with the piston 118 or may be molded separately and attached.

According to some embodiments of the invention, the dispensing head 108 may include external finger holds 132 to facilitate depression of the actuator button 130 connected to the piston 118. The exemplary finger holds 132 extend radially outwardly from the exterior surface of the dispensing head 108 and facilitate the depression of the button actuator 130 with the users thumb by providing a leverage point for the users index and middle fingers straddling the dispensing head 108.

Referring to FIGS. 8 and 10, a spring 134 may be captured between the piston 118 and the dispensing head 108 normally biasing the piston 118 and shut off valve 116 to the closed position.

In some embodiments, the spring 134 may comprise a slotted tubular spring element formed from a tensile polymer. The slotted tubular spring element 134 may be captured between opposing loading cones 136, 138 formed on the piston 118 and the dispensing head 108. In the exemplary embodiments, the slotted tubular spring element 134 is cylindrical in shape and the loading cones 136, 138 are generally conical in shape. The exemplary embodiments of the loading cones include a first frustoconical pre-loading wall section having a steeper wall angle greater than 11 degrees, and a second frustoconical primary loading wall section having a shallower wall angle of less than 11 degrees.

In some exemplary embodiments, all of the components of both the dispensing tap and the spring assembly are molded from the same plastic material making the entire dispensing tap easily recyclable in a single plastic material classification. Exemplary plastic materials include polypropylene (PP), high-density polyethylene (HDPE), and low-density polyethylene (LDPE). However, the disclosure should not be considered to be limited to these materials.

As seen in FIGS. 8 and 10, the piston loading cone 136 is axially compressible towards the lower fixed cone 138 within the open ends of the slotted tubular spring element 134 whereby the slotted tubular spring element 134 radially expands in tension to create an opposing radial contraction force. Deformation of the tubular spring walls elastically stores energy which will return the spring to its normal at rest shape when released. When released, the spring element 134 elastically contracts, in turn creating an axial extension force, and returns the upper piston cone 136 to its normal at rest position.

Some embodiments of the spring assembly include a spring element 134 having strain reducing ribs extending along the opposing edges of the longitudinal slot (See FIG. 20). The ribs may include outwardly convex surfaces extending both radially outward and circumferentially outward from the slot edges. This embodiment further includes a first thinner wall thickness at the slot edges and a second thicker wall thickness diametrically opposed from the slot edges. The arcuate surface along with the increasing wall thickness moving away from the slot edges, more evenly distributes strain throughout the spring element and extends the life cycle of the polymer spring element.

Referring now to FIG. 11, and according to other embodiments, the spring 134 may comprise a conventional coil spring 134A captured between the piston 118 and dispensing head 108. In this regard, the upper and lower loading cones 136, 138 act as spring guides.

In some embodiments, an atmospheric vent 140 may be provided in communication with an interior of the body 102 and in some embodiments, the vent 140 may be opened and closed with movement of the piston 118 and shut off valve 116. As best seen in FIGS. 8 and 10, a vent 140 extends between an interior surface of the dispensing head 108 and the interior of the body 108. The vent 140 may include ball valve 142 disposed on the interior of the body 108 to prevent fluid from escaping in at rest conditions. In certain embodiments of the invention the peripheral piston seal 120 is configured with a v-shaped multiple lip (chevron) seal for engagement with the vent opening formed on the interior surface of the dispensing head. In this regard, the peripheral chevron seal 120 may be engaged with, or overlie, the vent opening when the piston is in the closed position (See FIG. 8) and may be disengaged from the vent opening (See FIG. 10) when the piston is in the open position. This arrangement creates a self-venting system wherein the vent 140 and the shut off valve 116 are opened and closed simultaneously.

Figure 12:
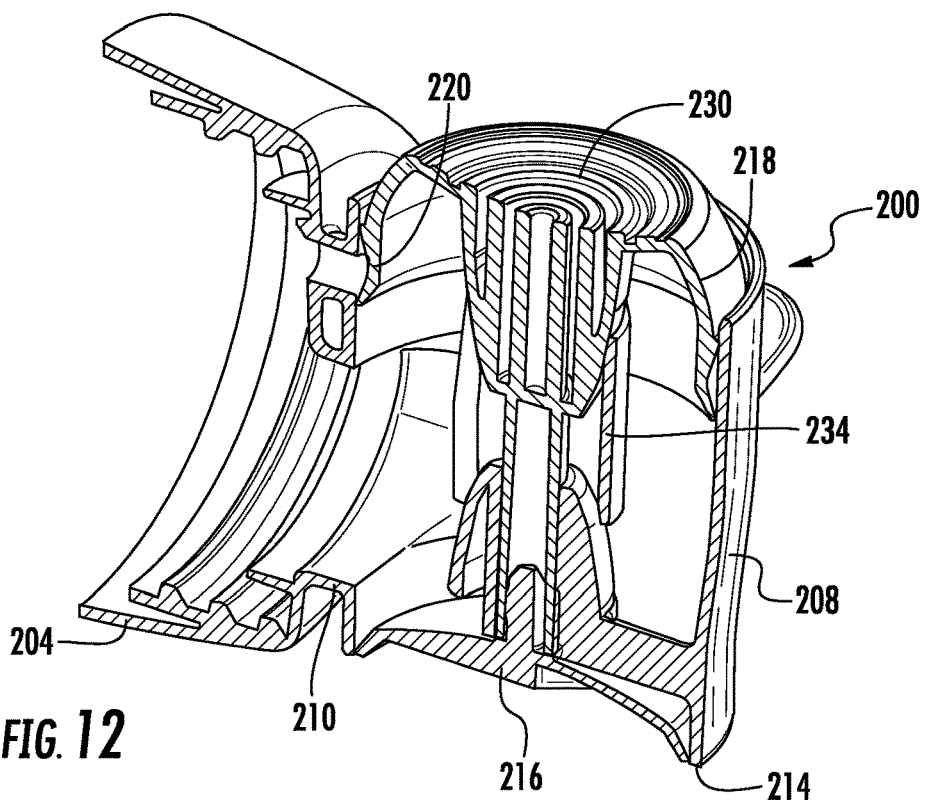
FIGS. 12 and 13 illustrate closed and open cross-sectional views of still another exemplary embodiment which does not include a ball valve.
Figure 13:
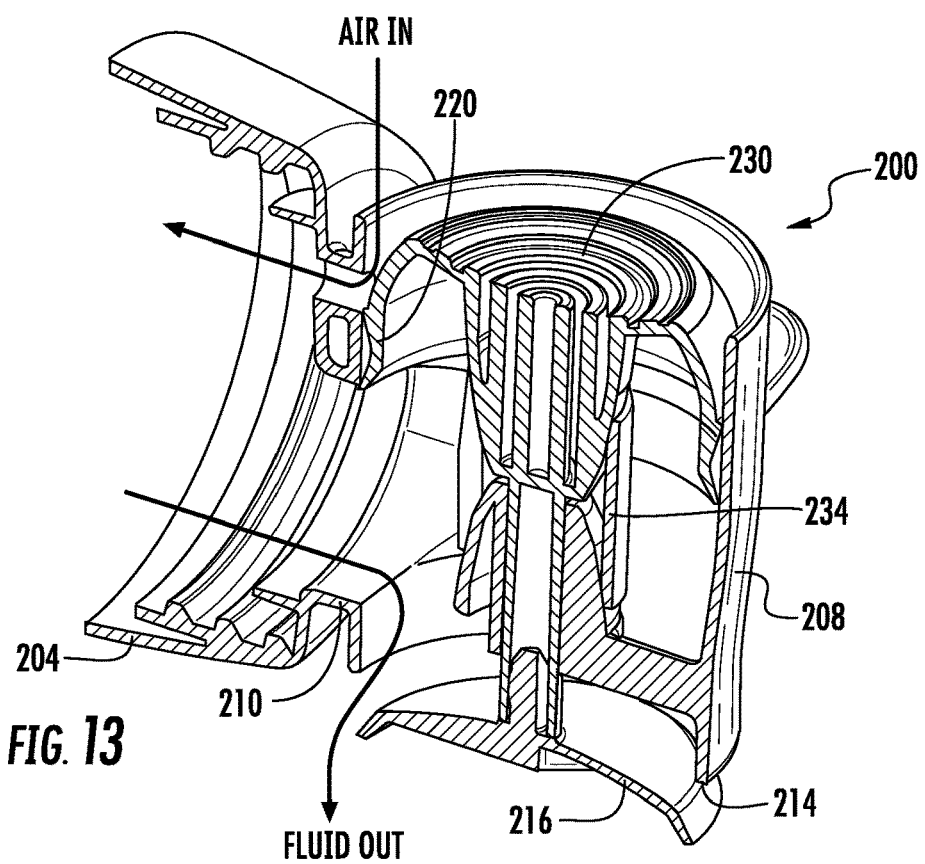

Referring to FIGS. 12 and 13, some embodiments 200 of the invention may exclude the ball valve structure and rely on only the chevron seal 220 to prevent fluid from escaping in at rest conditions. The embodiment 200 is structurally and functionally similar to tap 100, and includes body 202, dispensing head 208, throat 210, mouth 214, shut off valve 216, piston 218, button 230 and spring 234.

Figure 14:
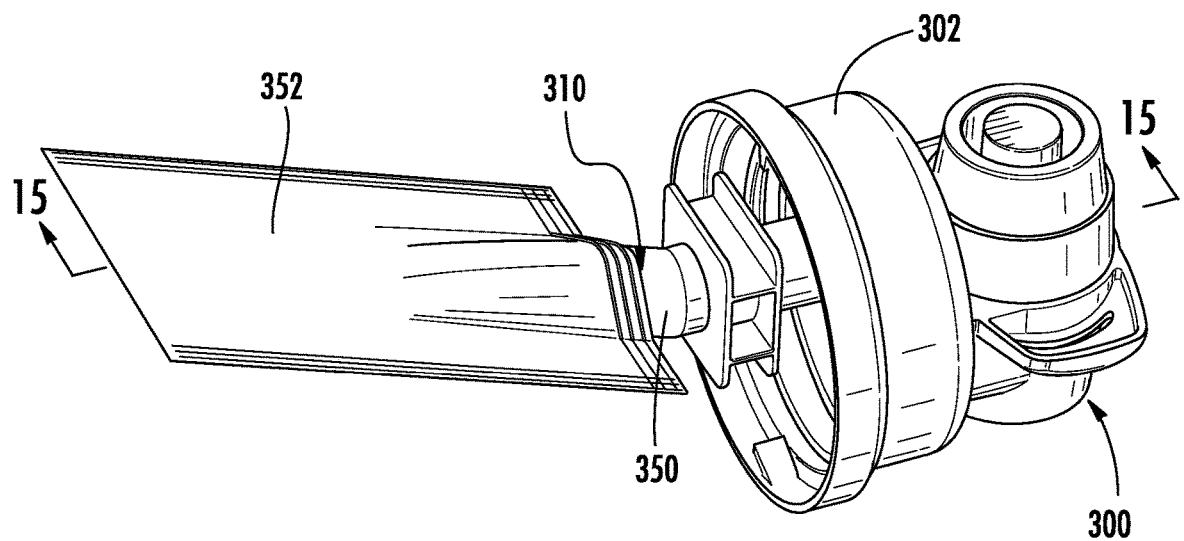
FIGS. 14 and 15 illustrate various views of an alternative self-venting structure in accordance with some embodiments of the invention.
Figure 15:
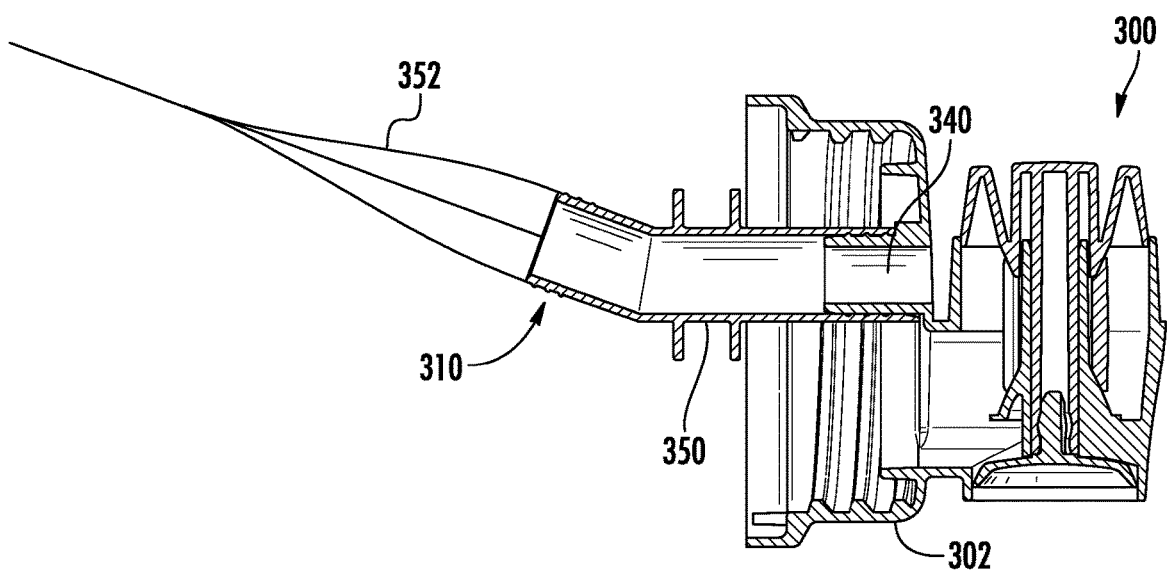

Other embodiments of the invention 300, as illustrated in FIGS. 14 and 15 may include an airless vent system 310. The vent 340 in these embodiments extends from an opening in the body 302 into the interior by means of an extension tube 350, and an expandable vent bag 352 is positioned on the terminal end thereof. The embodiment 300 is otherwise structurally and functionally similar to tap 100.

Figure 16:
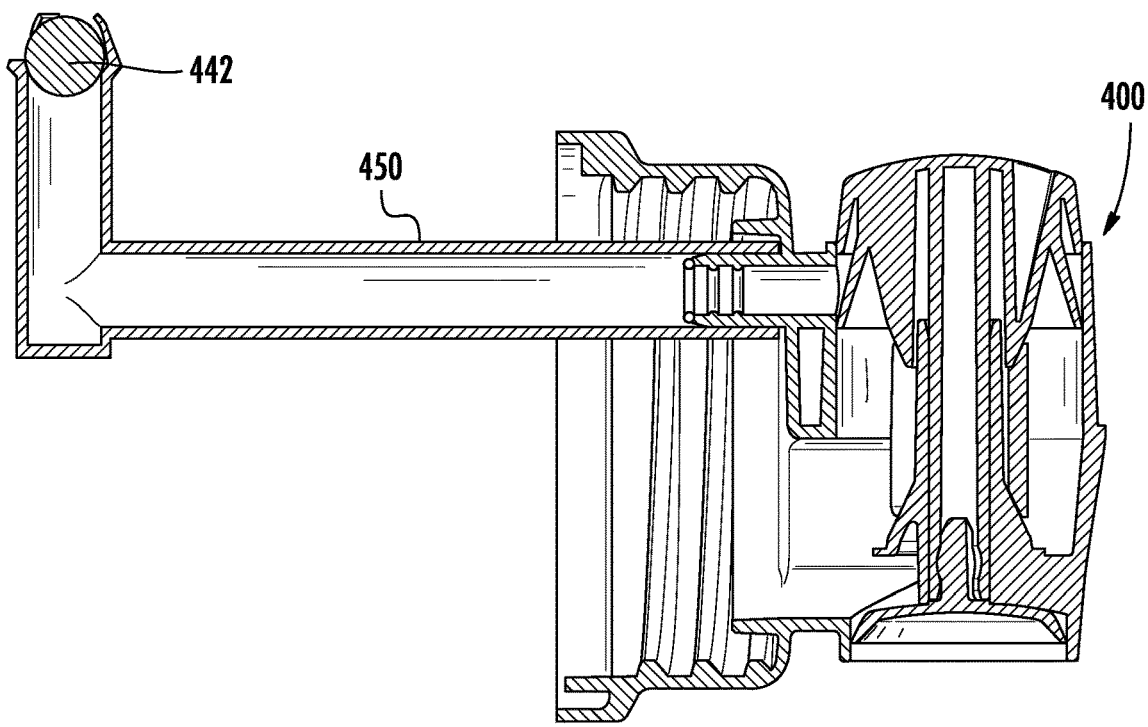
FIGS. 16 and 17 illustrate closed and open cross-sectional views of yet another self-venting structure in accordance with some embodiments of the invention.
Figure 17:
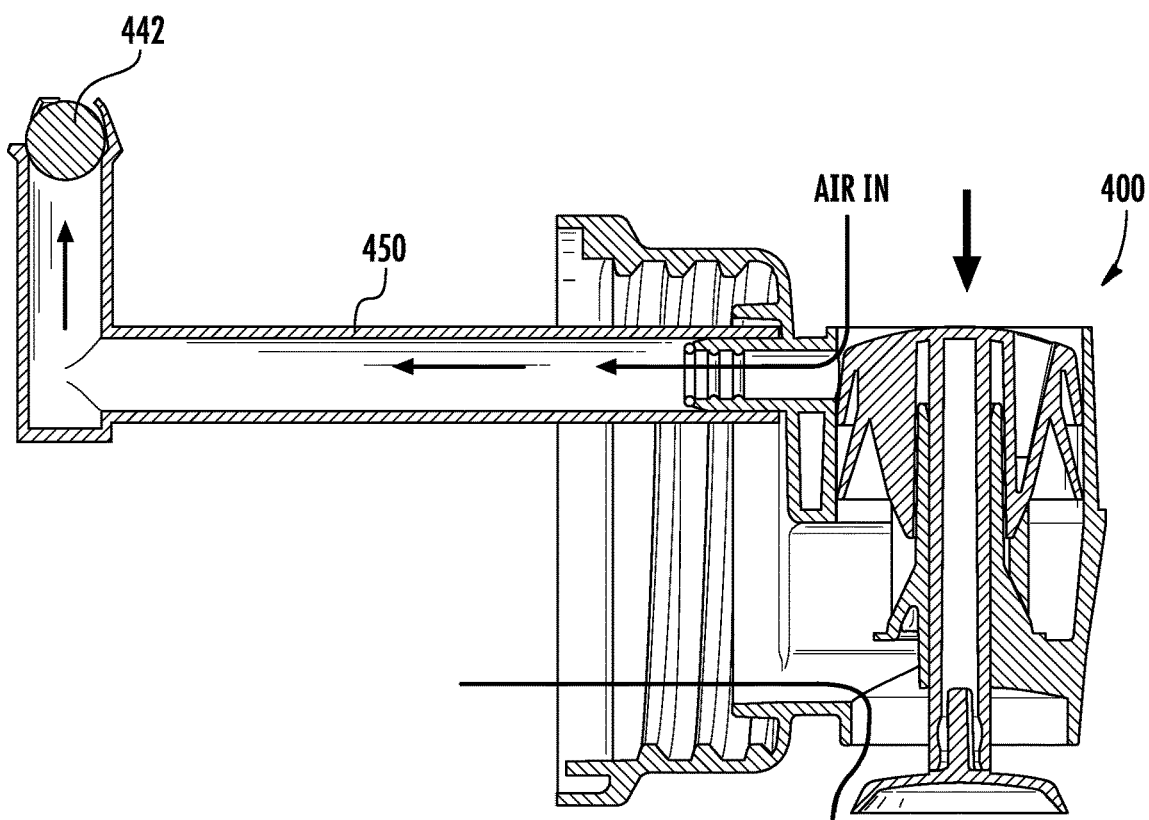
Figure 18:
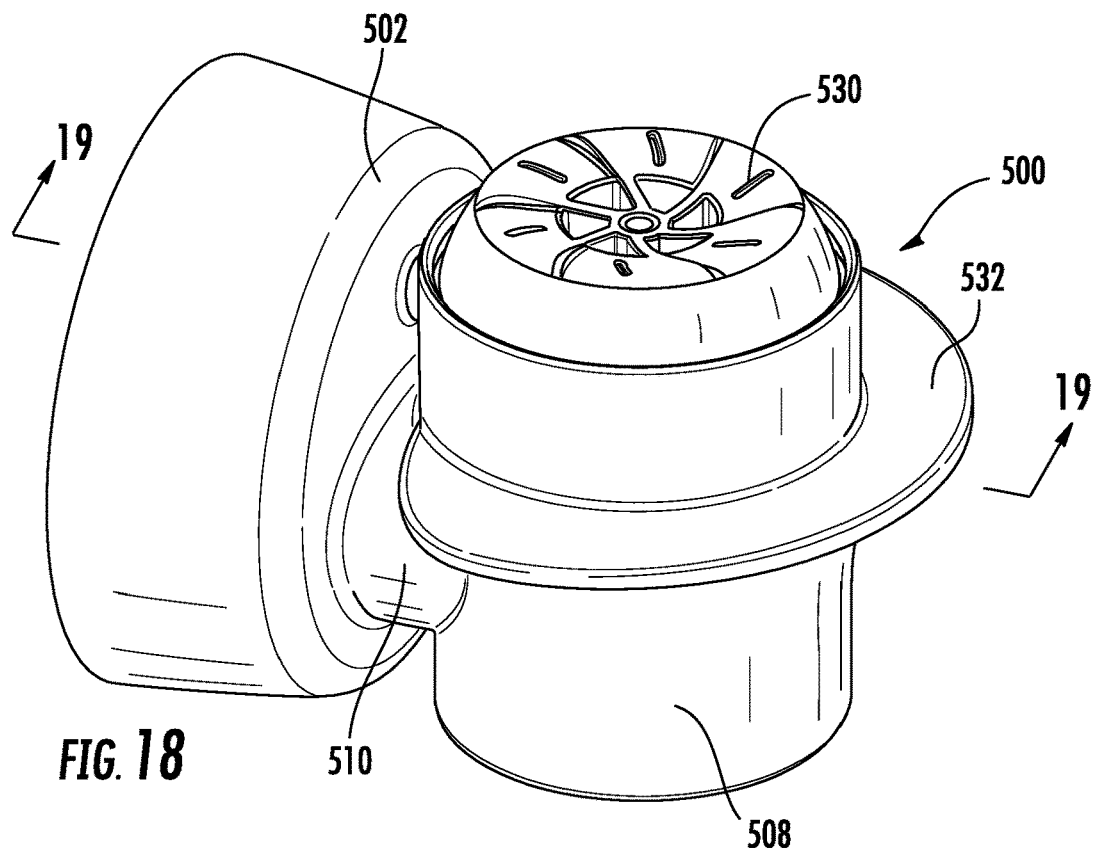
FIG. 18 illustrates a perspective view of yet another exemplary embodiment of a dispensing tap including a finger hold flange.
Figure 19:
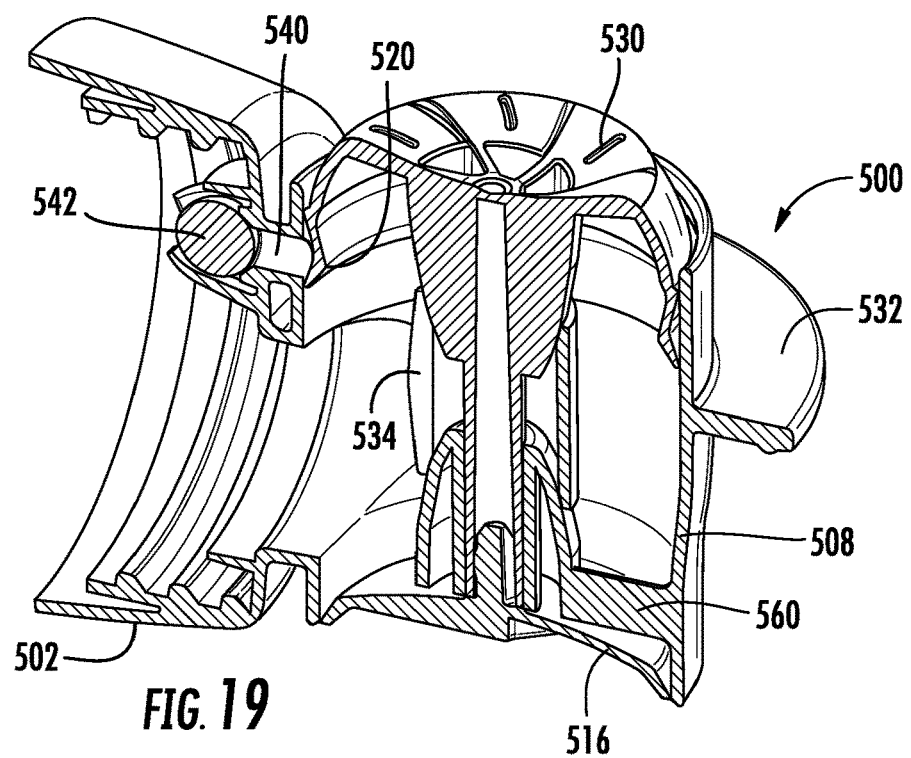
FIG. 19 illustrates a cross-section view thereof taken along line 19-19 of FIG. 18.

In other embodiments 400, as illustrated in FIGS. 16 and 17, a ball valve 442 may be located at the terminal end of an extension tube 450 which would extend into the interior of the container 900 when mounted. The embodiment 400 is otherwise structurally and functionally similar to tap 100.

Figure 4:
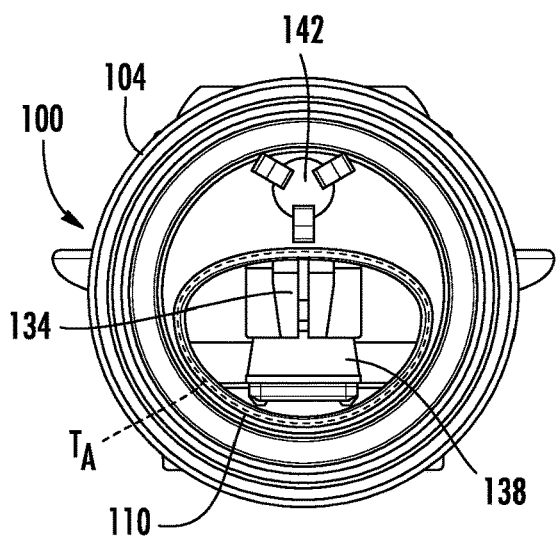
Figure 5:
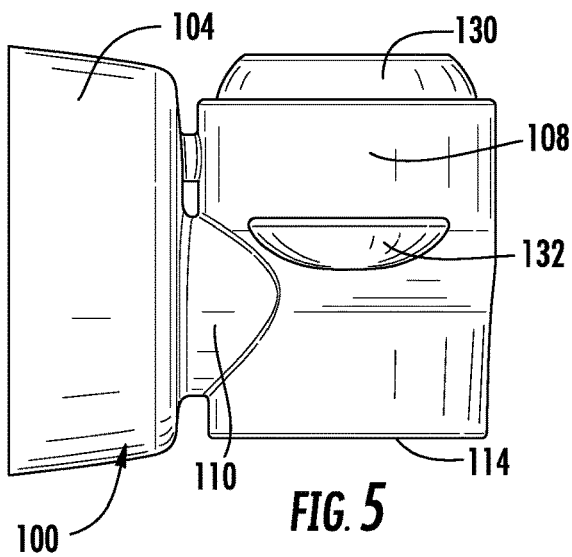
Figure 6:
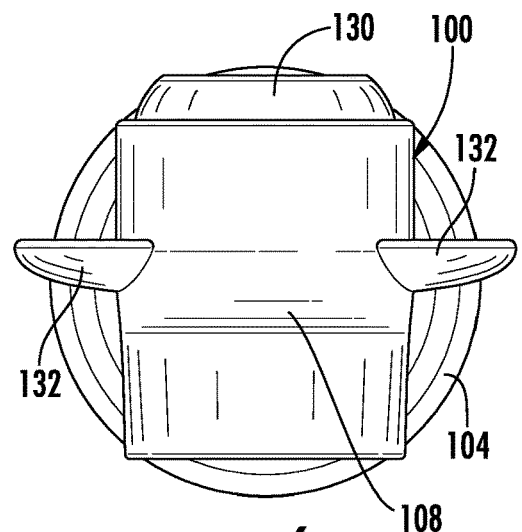
Figure 7:
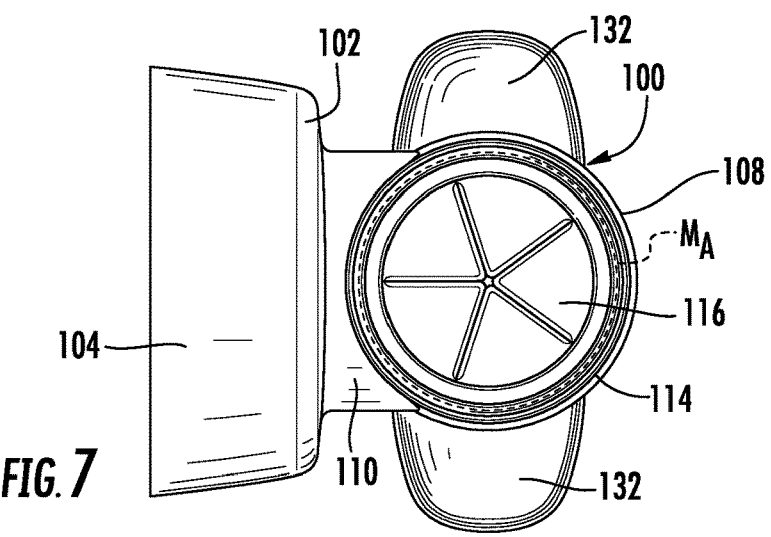

Referring back to FIGS. 1-10, in order to provide a high flow rate from the dispensing head 108, the cross-sectional flow area of the outlet or mouth $M_A$ may be greater than the cross-sectional flow area of the throat $T_A$. As best seen in FIGS. 4 and 7, the flow area of the throat $T_A$ (dashed lines in FIG. 4) is smaller than the flow area provided by the mouth $M_A$ (dashed lines in FIG. 7). The constricted throat area $T_A$ accelerates fluid flow through the throat and into the dispensing head 108 where the fluid can freely flow out of the larger diameter mouth 114.

In some embodiments, the diameter ($P_D$) of the peripheral seal 120 on the piston 118 is larger than the diameter ($V_D$) of the shut off valve 116. In this configuration, normal fluid head pressure is greater on the piston seal 120 than the shut off valve 116, and naturally exerts a higher force in the closed direction to keep the shut off valve 116 closed. The arrangement further works advantageously when external pressure is exerted on the container 900 to prevent leaks from the shut off valve 116. The configuration is visible in FIGS. 1-10 which show the upper piston portion of the dispensing head having a slightly larger diameter than the lower mouth portion. However, the features are best illustrated in FIG. 11 showing the two different internal diameters.

Referring to FIGS. 18-22, another exemplary embodiment 500 of the invention is illustrated. The illustrated embodiment 500 is nearly identical to the exemplars 100, 200 with the exception of an elongated radial finger flange 532 to facilitate actuation of the button actuator 530. The tap 500 includes a body 502, dispensing head 508, throat 510, shut off valve 516, piston 518, peripheral seal 520, valve stem 522, button 530, spring 532, vent 540 and ball valve 542. Referring to FIG. 21, the dispensing head 508 includes internal guide channel 524 and loading cone 538 which are integrally formed with the dispensing head 508 and suspended therein by radial support fingers 560. Referring to FIG. 22, the piston 518 includes integrally formed conical loading cone 536 and chevron peripheral piston seal 520.

Referring to FIGS. 23-31, some embodiments 600 of the invention may include an actuator lever 670 which engages with the top of the piston. The embodiment is similar in internal functional structure as the previous embodiments 100, 200, 500, with the exception of the lever 670 and finger hold structures 632. The tap 600 includes a body 602, dispensing head 608, throat 610, mouth 614, shut off valve 616, piston 618, seal 620, valve stem 622, button 630, spring 634, vent 640 and ball valve 642. The 670 lever may be L-shaped and pivotably anchored at one end 672 on the exterior of the body 602. A first leg 674 of the lever 670 extends over the top of the dispensing head 608 and is engaged with a raised shoulder 676 on the top surface of the piston 618. A second leg 678 of the lever 670 then depends downwardly and forwardly therefrom in front of the dispensing head 608.

Figure 23:
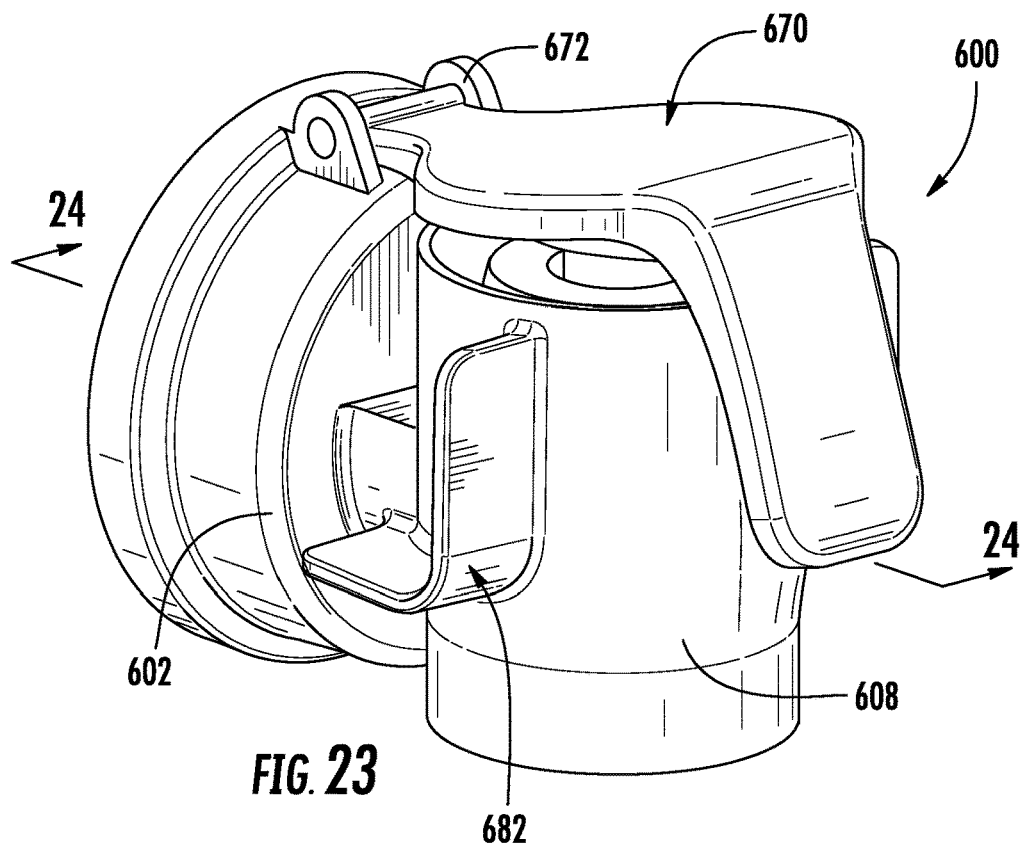
FIG. 23 illustrates a perspective view of a further exemplary embodiment of a dispensing tap including finger holds and a lever actuator.
Figure 24:
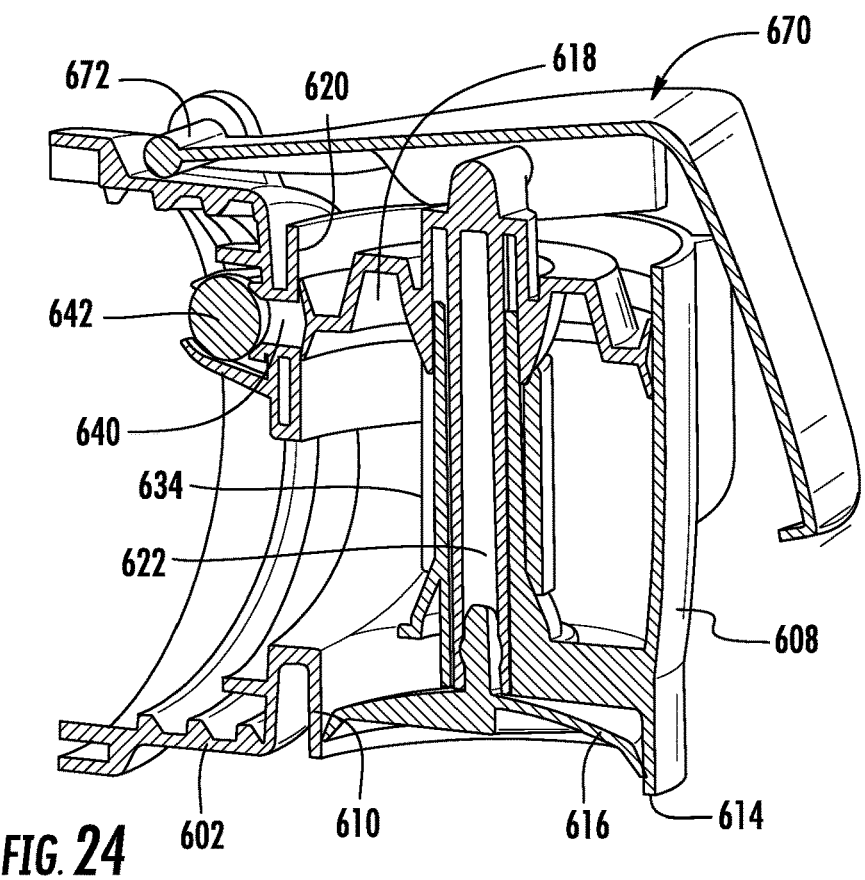
FIG. 24 illustrates a cross-sectional view thereof taken along line 24-24 of FIG. 23.
Figure 25:
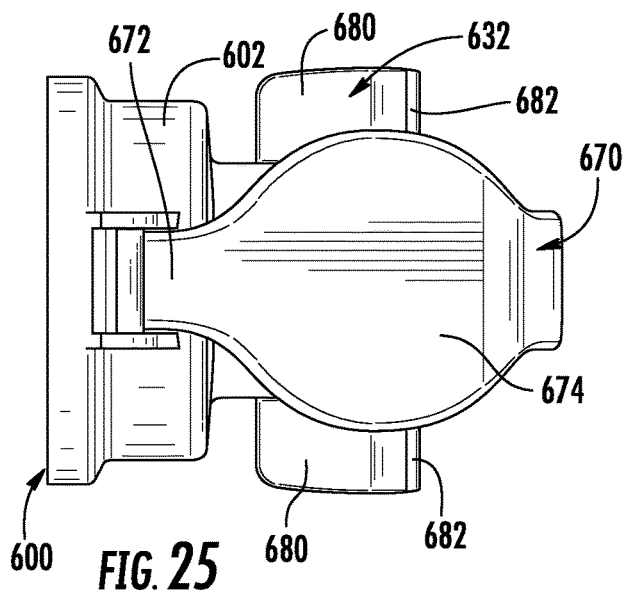
FIGS. 25-29 illustrate various views thereof.
Figure 26:
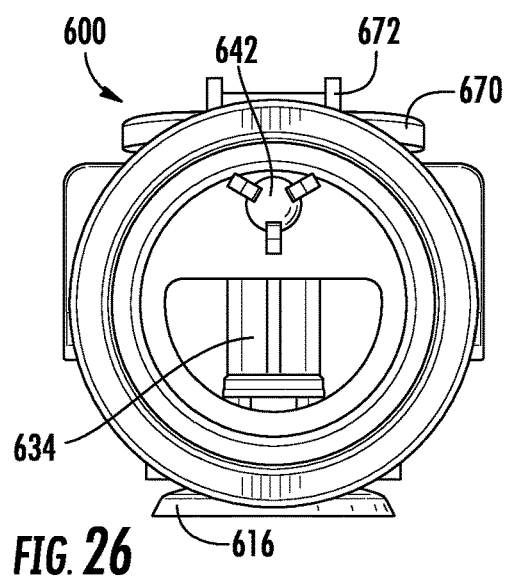
Figure 27:
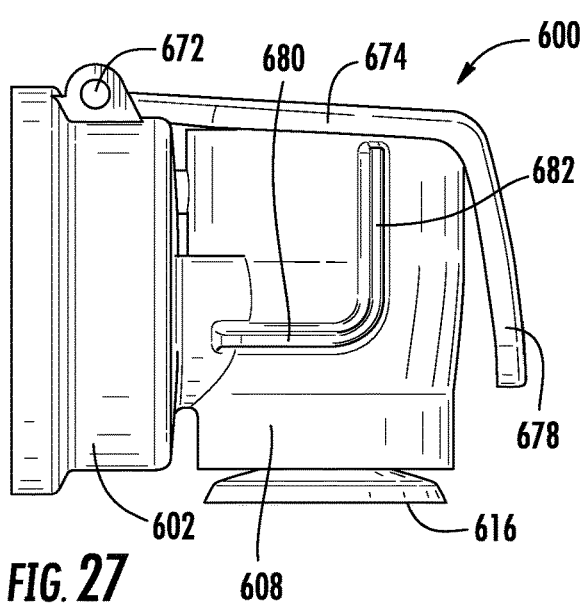
Figure 28:
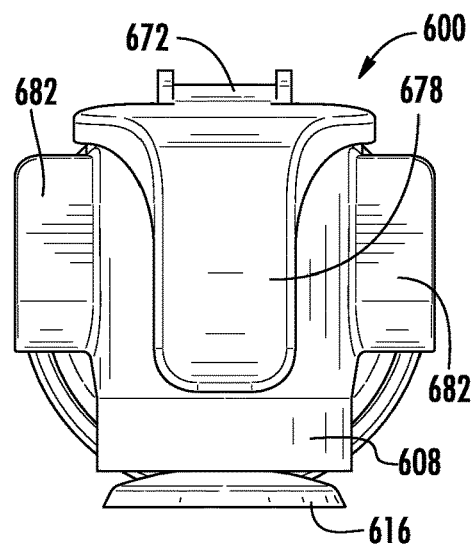
Figure 29:
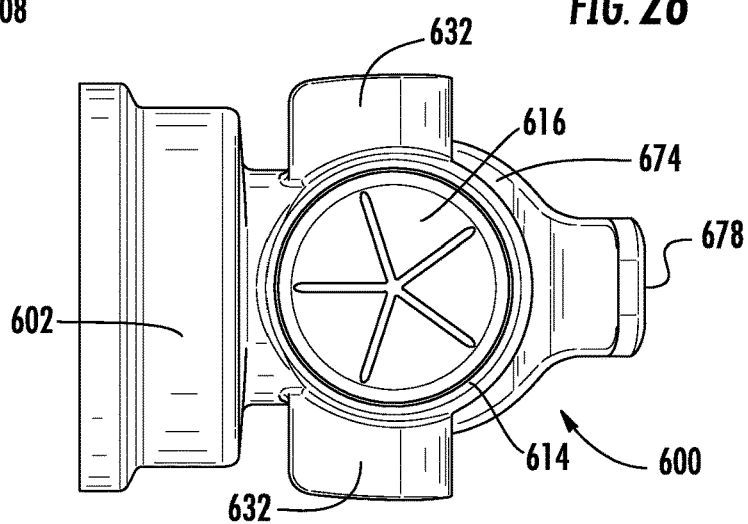
Figure 30:
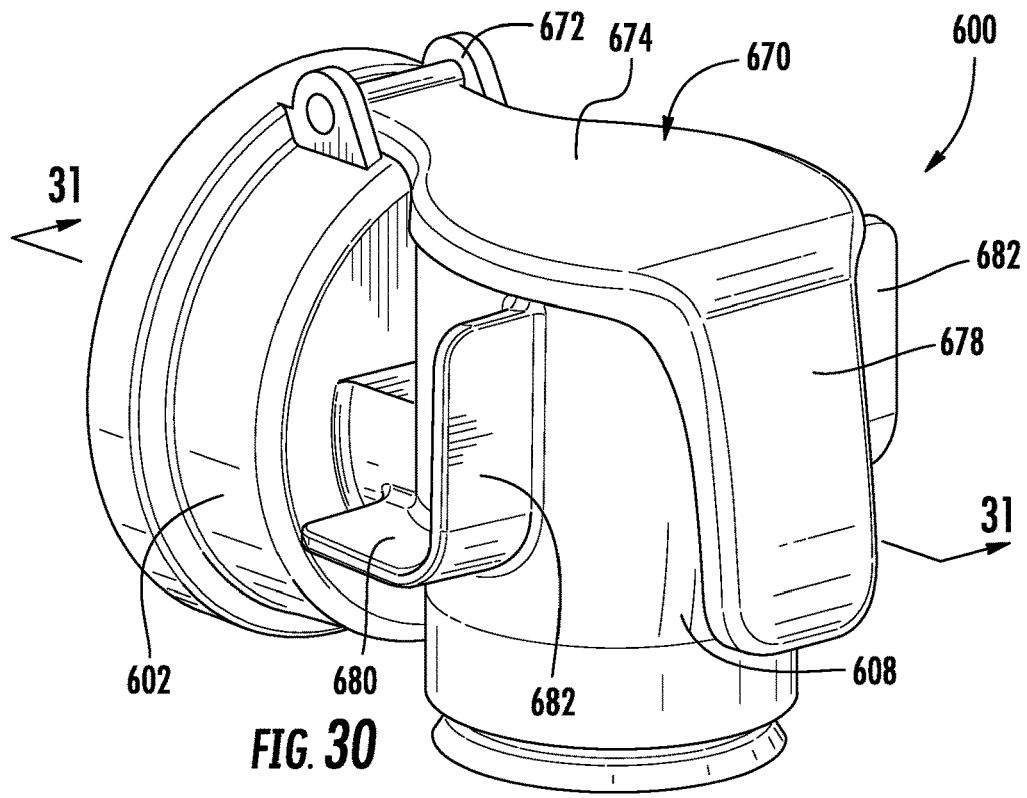
FIG. 30 illustrates a perspective view thereof with the lever actuator depressed for dispensing.
Figure 31:
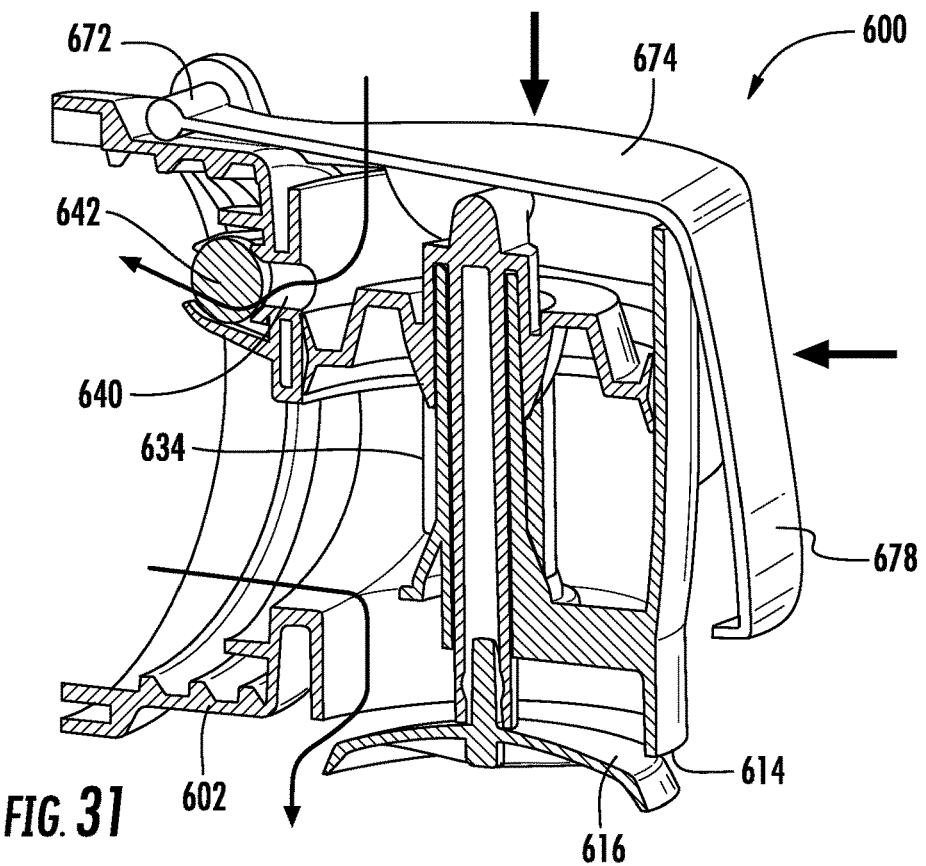
FIG. 31 is a cross-sectional view thereof taken along line 31-31 of FIG. 30.

As best seen in FIGS. 23 and 27, the finger hold structures 632 are also L-shaped with a horizontal leg 680 and a vertical leg 682.

In use, the operator may actuate the tap 600 by either pressing downwardly on the top (first leg 674) of the lever 670 or inwardly on the front (second leg 678) of the lever 670. In the first instance the horizontal legs 680 of the finger holds 632 may be used as a leverage point for the operators index and middle fingers as the first leg 674 is pressed downwardly by the thumb. In the second instance, the vertical legs 682 of the finger holds 632 may be used as leverage points for the same index and middle fingers as the operator pressed inwardly on the second leg 678. The lever 670 and finger holds 632 provide an improved ergonomic system and better user experience.

It can therefore be seen that the present disclosure provides for a novel dispensing system and a liquid dispensing tap having an ergonomic design, high flow rate, and self-venting dispensing tap for a high-viscosity, flowable fluid or liquid formulation, such as a laundry detergent.

Having thus described certain particular embodiments of the invention, it is understood that the invention defined by the appended claims is not to be limited by particular details set forth in the above description, as many apparent variations thereof are contemplated. Rather, the invention is limited only be the appended claims, which include within their scope all equivalent devices or methods which operate according to the principles of the invention as described.

What is claimed is:

1. A dispensing tap comprising:
   a body;
   a dispensing head;
   a throat connecting the body to the dispensing head and providing a flow path from the body to the dispensing head,
   the dispensing head including a mouth;
   a shut off valve configured for sealing engagement with the mouth of the dispensing head;
   a piston axially guided within said dispensing head,
     said piston including an actuator portion at an upper end thereof, said actuator portion including a peripheral seal slidably engaged with an interior surface of the dispensing head,
     said piston having a lower end including a valve stem coupled to said shut off valve, the piston being selectively actuable between a normally closed position wherein the shut off valve is seated within the mouth, and an open position wherein the shut off valve is disengaged from the mouth;
   a spring captured between the actuator portion of said piston and the dispensing head and normally biasing said piston and shut off valve to said closed position; and
   a vent adjacent to said actuator portion of said piston and in communication with an interior of said body, said vent being in operable communication with said peripheral seal.

2. The dispensing tap of claim 1 wherein the spring comprises a slotted tubular spring element formed from a tensile polymer, said slotted tubular spring element being captured between opposing loading cones formed on said piston and said dispensing head.

3. The dispensing tap of claim 1 wherein the spring comprises a coil spring.

4. The dispensing tap of claim 1 wherein a cross-sectional flow area of the mouth is greater than a cross-sectional flow area of the throat.

5. The dispensing tap of claim 4 wherein a diameter of said peripheral seal of said piston is larger than a diameter of said shut off valve.

6. The dispensing tap of claim 1 wherein the vent includes a ball valve disposed within an interior of the body.

7. The dispensing tap of claim 5 wherein said vent includes an extension tube and said ball valve is disposed at a terminal end of the extension tube.

8. The dispensing tap of claim 1 wherein the vent includes a vent opening on an interior surface of the dispensing head and extends into an interior of said body.

9. The dispensing tap of claim 8 wherein the vent includes a ball valve.

10. The dispensing tap of claim 9 wherein said peripheral seal is configured for sealing engagement with said vent opening,
   said peripheral seal being engaged with said vent opening when said piston is in said closed position, and being disengaged from said vent opening when said piston is in said open position.

11. The dispensing tap of claim 10 wherein a cross-sectional flow area of the mouth is greater than a cross-sectional flow area of the throat.

12. The dispensing tap of claim 8 wherein said peripheral seal is configured for sealing engagement with said vent opening,
   said peripheral seal being engaged with said vent opening when said piston is in said closed position and being disengaged from said vent opening when said piston is in said open position.

13. The dispensing tap of claim 8 wherein a cross-sectional flow area of the mouth is greater than a cross-sectional flow area of the throat.

14. The dispensing tap of claim 1 wherein said vent includes an expandable venting bag.

15. The dispensing tap of claim 1 wherein a diameter of said peripheral seal of said piston is larger than a diameter of said shut off valve.

16. The dispensing tap of claim 1 wherein said piston includes an actuator button.

17. The dispensing tap of claim 16 wherein said dispensing head includes finger holds extending from an exterior surface thereof.

18. The dispensing tap of claim 1 wherein said piston includes an actuator lever.

19. The dispensing tap of claim 18 wherein said dispensing head includes finger holds extending from an exterior surface thereof.

20. A dispensing tap comprising:
   a body;
   a dispensing head including an outlet;
   a throat connecting the body to the dispensing head,
   a shut off valve configured for sealing the outlet of the dispensing head;
   a piston disposed within said dispensing head, said piston having an actuator portion and a lower end including a valve stem coupled to said shut off valve, the piston being selectively actuable between a closed position and an open position;
   a spring captured between the actuator portion of said piston and the dispensing head and normally biasing said piston and shut off valve to said closed position, said spring comprising a slotted tubular spring element formed from a tensile polymer, said slotted tubular spring element being captured between opposing loading cones formed on said piston and said dispensing head; and
   a vent adjacent to said actuator portion of said piston.

* * * * *